United States Patent [19]

Au

[11] 3,828,362

[45] Aug. 6, 1974

[54] BINARY SIGNAL DATA DETECTION

[75] Inventor: Sik-Kee Au, San Jose, Calif.

[73] Assignee: International Business Machines Corporation, Armonk, N.Y.

[22] Filed: Jan. 26, 1973

[21] Appl. No.: 327,034

[52] U.S. Cl. .................................................. 360/45
[51] Int. Cl. .............................................. G11b 5/44
[58] Field of Search ....................................... 360/45

[56] References Cited

UNITED STATES PATENTS

| | | | |
|---|---|---|---|
| 3,271,750 | 9/1966 | Padalino | 340/174.1 |
| 3,408,640 | 10/1968 | Masson | 340/174.1 |
| 3,491,349 | 1/1970 | Sevilla et al. | 340/174.1 |
| 3,622,894 | 11/1971 | Heidecker | 340/174.1 |
| 3,699,554 | 10/1972 | Jones | 340/174.1 |
| 3,715,738 | 2/1973 | Kleist et al. | 340/174.1 |
| 3,719,934 | 3/1973 | Behr et al. | 340/174.1 |

*Primary Examiner*—Vincent P. Canney
*Attorney, Agent, or Firm*—Nathan N. Kallman

[57] ABSTRACT

A binary data signal is detected by shaping readout data in a pulse slimmer using a single delay line, and by center line clipping to eliminate high frequency noise from the output signal developed by the pulse slimming channel. The shaped signal is then separated, according to polarity, to achieve amplitude detection.

13 Claims, 3 Drawing Figures

BINARY SIGNAL DATA DETECTION

BACKGROUND OF THE INVENTION

1. Field of the Invention

This invention relates generally to binary data signal detection, and in particular to a detection method and means of signal shaping and amplitude separation.

2. Description of the Prior Art

Detection of binary data signals is commonly accomplished by peak detection and differentiation. However, when peak detection is used, the data signal is degraded by peak shift or phase shift, particularly for high density data. Peak shift occurs due to bit crowding, or peak shift may be caused by the bandwidth limitation of the recording channel. Another problem experienced during data detection is that signals which are distributed over a relatively wide frequency range experience different phase shifts for different frequency components. It is known that any data signal with less than 100 percent resolution will cause a peak shift problem.

An additional problem with conventional detection circuits is that signal differentiation emphasizes high frequency noise, which causes the signal-to-noise ratio to be lowered substantially. As a result of all these undesirable phenomena that occur in systems using peak detection and differentiation, it is necessary in such systems to limit the bit density of recorded data and thus reduce overall storage capacity. In addition, it is usually necessary to employ phase compensation circuits in order to retrieve data accurately, thereby adding to costs of components and maintenance.

SUMMARY OF THE INVENTION

An object of this invention is to provide a binary data detection circuit that does not suffer from peak shift problems.

Another object of this invention is to provide a data detection circuit with relatively fewer components and yet with improved performance.

Another object is to provide a data detection circuit that operates with an increased signal-to-noise ratio.

According to this invention, detection of a binary data signal is accomplished by shaping the signal in a pulse slimming channel using a single delay line to extend channel bandwidth, and by nonlinear center line clipping to eliminate high frequency noise. The low frequency noise is minimized by the process of differentiation inherent in the operation of the magnetic read-write channel. After substantially eliminating noise and transients, the "clean" pulse signal is separated into different channels, by means of amplitude sensing, to obtain data signals of positive and negative polarity, which are then combined in proper synchronism to produce the recovered data.

BRIEF DESCRIPTION OF THE DRAWING

The invention will be described in greater detail with reference to the drawing in which.

DESCRIPTION OF THE PREFERRED EMBODIMENT

Figure 1:
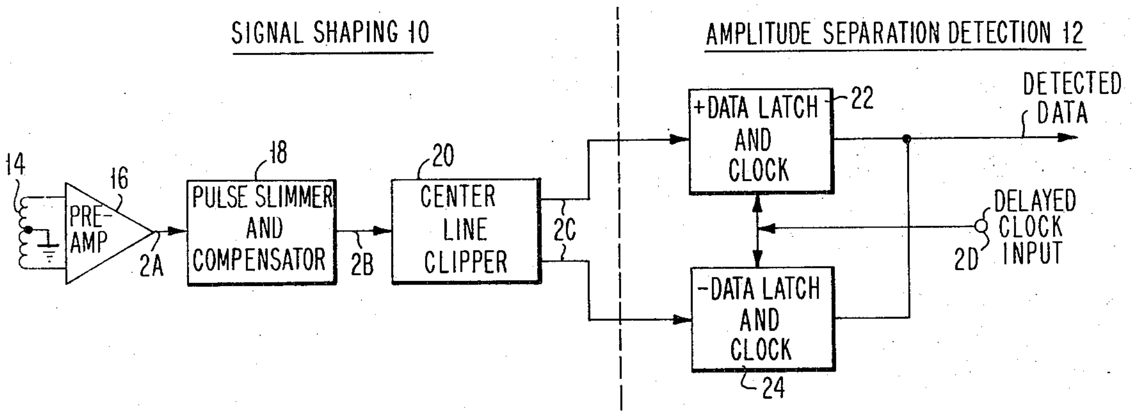
FIG. 1 is a schematic block diagram of an embodiment of the detection circuit of this invention.
Figure 2:
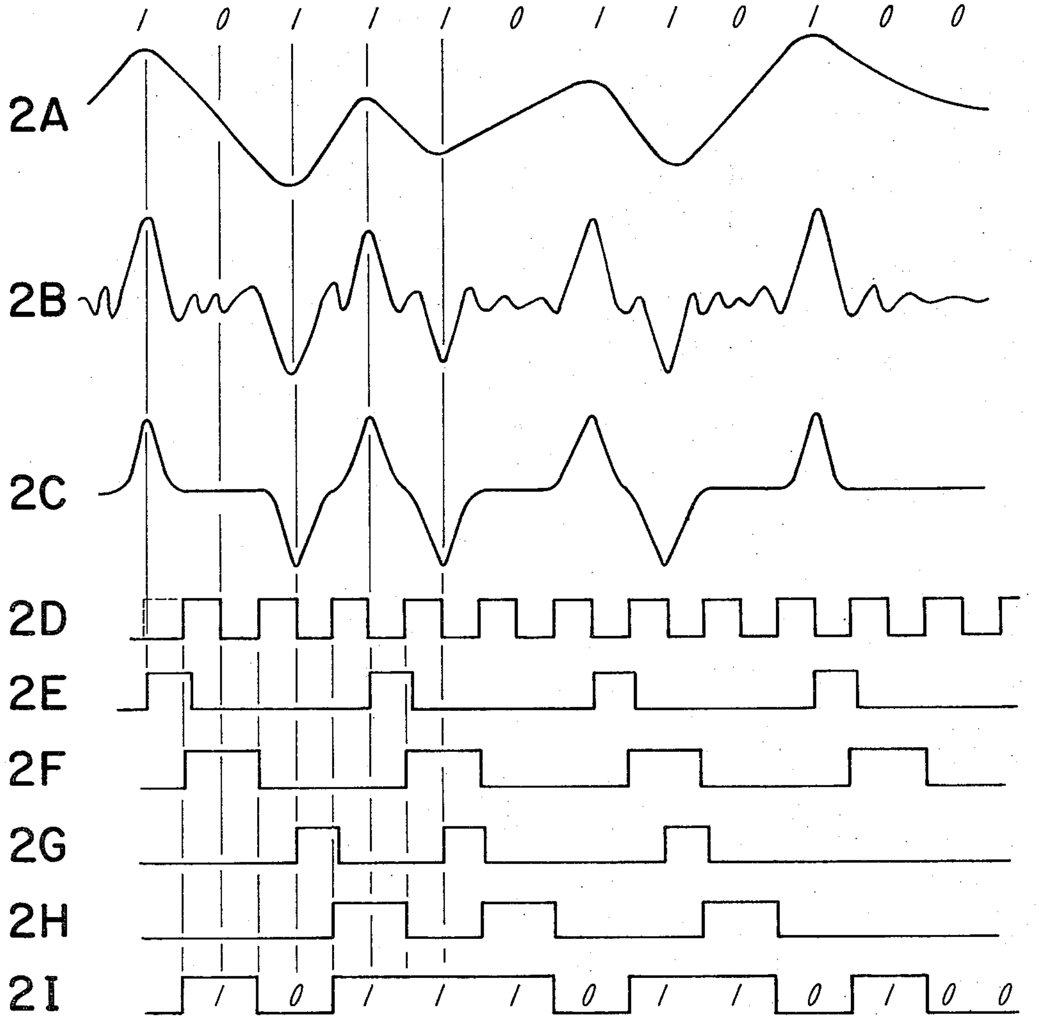
FIG. 2 is a series of waveforms to aid in the explanation of the invention.

With reference to FIGS. 1 and 2, the detection circuit of this invention comprises a signal shaping network 10, and an amplitude separation detection network 12 coupled thereto. A data readout signal (FIG. 2A), which may be NRZI encoded, is sensed by a magnetic transducer or head 14, and passed through a preamplifier 16, in a well-known manner. The magnetic head acts as a differentiator at low frequencies, and thus does not generate any DC components. The amplified signal is then processed by a pulse slimming and compensator channel 18, which includes a single delay element 22 (see FIG. 3) to produce narrow pulses (FIG. 2B) with emphasized peaks. A relatively short delay of about 15 nanoseconds, for example, is applied to the pulses, through the nonterminated single delay line 22 to obtain a high resolution data signal. However, the narrowed pulse (FIG. 2B) with an emphasized peak contains a significant amount of high frequency noise centered about the center line of the data signal.

To eliminate the base line noise, the signal (FIG. 2B) is applied to a nonlinear clipping stage 20. The resultant signal (FIG. 2C) resembles a readback signal from an ideal channel with near zero db at the highest data frequency. The clipped high resolution signal is insensitive to low and high frequency noise.

As a result, the signal can be detected by an amplitude separation technique. To this end, the data signal is separated into positive and negative pulses (FIGS. 2E and 2F) through respective channels, which include data latches 22 and 24. The separated data is combined at the output circuits of latches 23 and 25 under control of a delayed clock (FIG. 2H) to produce a signal waveform (FIG. 2I) representative of the data being recovered.

Figure 3:
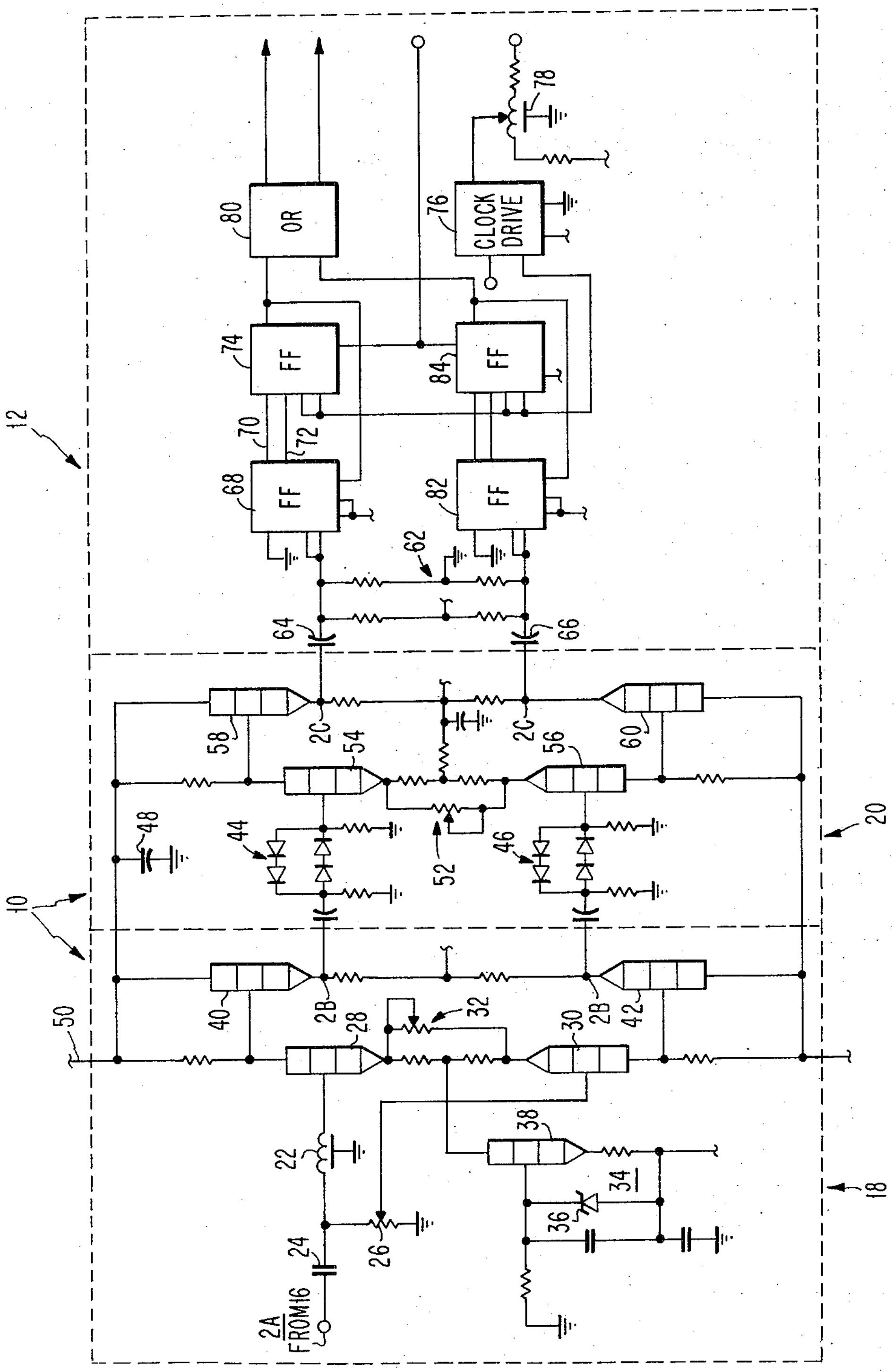
FIG. 3 is a schematic circuit diagram of a specific implementation of the detection circuit depicted in FIG. 1.

The novel binary data detection circuit is illustrated in further detail in FIG. 3. The signal 2A from preamplifier 16 is passed through AC coupling capacitor 24 to the single delay line 22, whereby the pulse signal is delayed by less than one-tenth of the isolated pulse width. A resistor 26 which is connected between the capacitor 24 and delay 22 adjusts the gain to trim the sides of the pulse and aid the slimming action. The original input signal is subtracted by the delay and reflected delay to provide the desired narrow pulse.

Coupled to the output of the delay 22 is a transistor circuit, including NPN transistors 28 and 30, which serve as a differential amplifier. A variable resistance network 32, coupled between the transistors 28 and 30, adjusts the gain to bring the signal within a range that will enable center slicing or clipping of the slimmed pulse signal having emphasized peaks. Connected between the NPN transistors 28 and 30 and to the variable resistance network 32 is a constant current source arrangement 34, including a Zener diode 36 and transistor 38. The constant current source 34 acts to increase the common mode rejection of the differential amplifier transistors 28 and 30. A decoupling capacitor 48 which is coupled to a source of positive potential 50 serves to remove high frequency noise from the power supply. A differential signal 2B is taken from the collectors of the transistors 28 and 30 and applied to an emitter follower stage including transistors 40 and 42, which pass the peak emphasized, narrow pulses to the next stage, the center line slicing or clipping stage 20.

The signal waveform, FIG. 2B, is directed to the center slicing amplifier 20, that includes nonlinear diode matrices 44 and 46, which serve to clip a portion of the signal around the center line within a predetermined range, thereby leaving emphasized narrow peaks and also limiting noise. The signals from the diode matrices 44 and 46 are applied through differential amplifier transistors 54 and 56, between which a variable resistance network 52 is connected. A pair of emitter followers 58 and 60 passes the center sliced signal waveform 2C to the data latch and clocking separation circuit 12, which provides amplitude separation and signal detection.

The peak emphasized, shaped and clipped data pulse signal is fed to a resistive biasing network 62 through AC coupling capacitors 64 and 66. The data signal is separated into two channels for processing positive and negative data respectively. Bistable multivibrator or flip-flop 68 is conditioned to generate a positive pulse 2E in response to a positive signal input exceeding a preset threshold. The positive output 2E from flip-flop 68 is directed through lead 70 and an inverse negative pulse is directed along lead 72 to a second flip-flop 74. A delayed clock, FIG. 2D, provided by clock drive 76 coupled to adjustable delay 78 is applied to flip-flop 74. The clock is applied with its positive triggering edge delayed approximately one-half bit cell time. This delay may vary from 20 to 30 percent of a bit cell period without degrading the detection process. The clock delay may be set for a predetermined period to optimize error rate. At clock trigger time, if the output at the flip-flop 68 is up or positive, the output of flip-flop 74 will also be triggered to provide a positive pulse. This condition will reset the flip-flop 68. The next clock trigger 2D will reset flip-flop 74. In this manner, a binary one is detected and passed through logic OR gate 80.

The complementary channel including flip-flops 82 and 84 are poled to detect data pulses of negative polarity, in a manner similar to that described for the positive data pulse detection channel. Thus, positive and negative data pulses are applied to the OR gate 80 under strobe control of the timing circuit 76 and 78, and the combined data pulse train is directed to a readout or utilization circuit.

The detection circuit taught herein may be used with various digital data codes including NRZI, double frequency and variations thereof. By using this detection technique, channel bandwidth can be extended and data density increased. For example, densities of 8,000 to 9,000 bits per inch can be successfully detected at a data rate of 15 megabits per second, in a magnetic disk file. The data separation circuit can provide a wide window for data detection. With the circuit of this invention, a significant improvement in binary data detection is realized with simple circuitry and reduction in cost.

It should be understood that changes and modifications of the circuit may be made within the scope of the invention. For example, in lieu of some of the flip-flop logic delineated above, single-shots or monostable multivibrators may be used with limiters for amplitude separation.

What is claimed is:

1. A data detection system for processing a binary pulse data signal comprising:

transducing means for reading out the recorded data signal, said transducing means effectively differentiating said data signal thereby minimizing DC and low frequency signal components;

a signal shaping network having a pulse slimmer for narrowing the readout signal pulses and for emphasizing the peaks of said pulses, said pulse slimmer including a nonterminated single delay element for narrowing said pulse signal thereby emphasizing the peaks of said pulse signal, and further having clipping means coupled to said pulse slimmer for removing high frequency signal components from said narrowed pulse signal;

amplitude separation means coupled to said signal shaping network for separating the positive and negative pulses of said readout signal; and means for combining the separated signals in response to a timing signal thereby producing an accurate representation of the recorded data.

2. A data detection system as in claim 1, wherein said clipping means clips a portion of said slimmed signal centered about the base line of the signal waveform.

3. A data dection system as in claim 1, wherein said clipping means is nonlinear.

4. A data detection system as in claim 1, wherein said amplitude separation means comprises two channels coupled to said signal shaping network, for processing the positive and negative polarity pulses respectively.

5. A data detection system as in claim 1, wherein said signal pulses are narrowed by said pulse slimmer approximately 25 per cent using a delay time one-tenth of an isolated pulse width.

6. A data detection system as in claim 5, including variable resistance means in said pulse slimmer for adjusting the gain of the circuit to trim the sides of the data pulses.

7. A data detection system as in claim 1 wherein said signal shaping network includes a differential amplifier; and a constant current source to increase the common mode rejection of said amplifier.

8. A data detection system as in claim 1, wherein said clipping means includes nonlinear diode matrices for clipping a portion of the data signal around a center line of the waveform of said signal and within a predetermined range, thereby minimizing high frequency noise.

9. A data detection system as in claim 1, wherein said combining means includes an adjustable delayed clock for combining said separated pulses.

10. A method of reading out recorded binary data comprising the steps of:

sensing the recorded data by a transducer and simultaneously differentiating the sensed data signal to minimize DC and low frequency signal components;

shaping the data signal by pulse slimming with a nonterminated single delay element and by center line clipping to remove high frequency signal components;

separating the shaped data signal by passing positive and negative pulses of said signal through separate channels; and combining the separated signals in response to a timing signal.

11. A data detection system for processing a binary pulse data signal comprising:

transducing means for receiving binary pulses to be processed;

a pulse slimmer including a nonterminated single delay element coupled to said transducing means for narrowing said pulses;

a variable resistance coupled to said delay element for adjusting the gain to trim the sides of said pulses;

a differential amplifier coupled to said delay element;

a constant current source for increasing the common mode rejection of said differential amplifier;

clipping means for clipping a portion of the processed pulse around the center line thereby passing narrow pulses with emphasized peaks;

amplitude separation means including two channels for separating pulses of positive and negative polarity respectively; and clock drive means for strobing the separated positive and negative pulses to combine said pulses.

12. A data detection system as in claim 11, further including a variable resistance network coupled to said differential amplifier for adjusting the gain.

13. A data detection system as in claim 11, wherein said clipping means comprises diode matrices.

* * * * *